(12) United States Patent
Logan et al.

(10) Patent No.: US 7,453,407 B2
(45) Date of Patent: Nov. 18, 2008

(54) ANTENNA CONSTRUCTIONS FOR ELECTRONIC DEVICES AND METHODS FOR MANUFACTURING SUCH ANTENNA CONSTRUCTIONS

(75) Inventors: Brian Matthew Logan, Akron, OH (US); Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/618,744

(22) Filed: Dec. 30, 2006

(65) Prior Publication Data

US 2008/0158072 A1 Jul. 3, 2008

(51) Int. Cl.
*H01Q 1/32* (2006.01)

(52) U.S. Cl. .................. 343/711; 343/717; 343/897

(58) Field of Classification Search ............ 343/711, 343/717, 897, 700 MS
See application file for complete search history.

(56) References Cited

U.S. PATENT DOCUMENTS

| | | | |
|---|---|---|---|
| 6,492,960 B2 | 12/2002 | Sullivan | |
| 6,546,982 B1 | 4/2003 | Brown et al. | |
| 6,885,291 B1 | 4/2005 | Pollack et al. | |
| 7,009,576 B2 | 3/2006 | Adamson et al. | |
| 7,102,499 B2 | 9/2006 | Myatt | |
| 2003/0221766 A1 | 12/2003 | Strache et al. | |
| 2005/0170100 A1 | 8/2005 | Ramsey | |
| 2005/0170101 A1 | 8/2005 | Ramsey | |
| 2005/0171227 A1 | 8/2005 | Ramsey | |
| 2005/0196605 A1 | 9/2005 | Ramsey | |
| 2005/0203202 A1 | 9/2005 | Ramsey | |
| 2005/0203205 A1 | 9/2005 | Ramsey | |
| 2005/0234152 A1 | 10/2005 | Ramsey | |
| 2006/0022879 A1* | 2/2006 | Kish et al. | 343/711 |
| 2006/0022893 A1* | 2/2006 | Kish et al. | 343/897 |
| 2006/0041047 A1 | 2/2006 | Ramsey | |
| 2006/0189113 A1 | 8/2006 | Vanheusden et al. | |

FOREIGN PATENT DOCUMENTS

| | | |
|---|---|---|
| EP | 1454770 A1 | 9/2004 |
| JP | 200030023 A | 1/2000 |
| WO | 9856072 | 12/1998 |
| WO | 03038747 | 5/2003 |

OTHER PUBLICATIONS

European Patent Office, European Search Report issued in corresponding European Application serial No. 07123595 dated May 13, 2008 (2 pages).

* cited by examiner

*Primary Examiner*—Hoang V Nguyen
(74) *Attorney, Agent, or Firm*—Wood, Herron & Evans LLP

(57) ABSTRACT

Antenna constructions for electronic devices and methods of manufacturing such antenna constructions. The electronic device comprises a transponder and an antenna electrically coupled with the transponder. The antenna has a core of a first material and a coating of a second material on the core. The second material has a higher electrical conductivity than the first material and/or a lower permeability than the first material. The coating on the core also has a predetermined thickness. The electronic devices may be used in tires.

17 Claims, 2 Drawing Sheets

ANTENNA CONSTRUCTIONS FOR ELECTRONIC DEVICES AND METHODS FOR MANUFACTURING SUCH ANTENNA CONSTRUCTIONS

FIELD OF THE INVENTION

The invention relates to electronic devices, and to antenna constructions for electronic devices and methods for manufacturing such antenna constructions.

BACKGROUND OF THE INVENTION

Electronic devices and systems have been employed for, among other applications, monitoring the pressure of tires mounted on a vehicle and providing the operator of the vehicle with information relating to tire pressure. These electronic devices and systems may also monitor other physical parameters of the tire, such as operating temperature. Many systems utilize radio frequency communication between the tire and an external interrogating device. A radio frequency communication link requires one or more antennas. Tire pressure may be monitored using an electronic device placed inside the air cavity of the tire. The electronic device may include a passive resonant circuit or may be capable of transmitting a radio frequency (RF) signal that reflects the monitored tire pressure to a remote receiver. The electronic device typically incorporates a unique identifying code carrying information for identification and tracking during manufacture, storage, distribution, and use.

The electronic device inside the tire includes one or more antennas used to transmit and receive the RF signals. The antenna may be helically shaped to absorb tensile and bending stress applied by to the tire during operation. The helical shape may also aid to prevent damage during manufacture of the tire. Most conventional antennas consist of a coiled wire formed of solid steel, copper or copper alloy, aluminum, or brass, or a steel core coated with either brass or zinc. In the latter constructions, the brass or zinc coating is applied to the steel wire during drawing and operates as a die lubricant. Consequently, the final thickness of zinc or brass on the spring steel is not intentionally controlled during manufacture of the antenna.

Although conventional antennas have been effective for their intended purpose, advances in antenna design are needed to optimize the properties of the electronic devices used in, for example, tires.

SUMMARY OF THE INVENTION

The embodiments of the invention relate to an electronic device that may be used with a tire or other types of objects. In one embodiment, the electronic device comprises a transponder and an antenna electrically coupled with the transponder. The antenna comprises a core of a first material and a coating of a second material on the core. The second material has at least one of a higher electrical conductivity than the first material or a lower permeability than the first material. The coating also has a predetermined thickness.

In one embodiment, the coating may comprise a plurality of microparticles, a plurality of nanoparticles, or a blend thereof. In another embodiment, the first material may comprise a polymer resin or an engineered material. The antenna may have the geometrical shape of a coil with a plurality of helically wound turns, although the invention is not so limited. In yet another embodiment, the predetermined thickness may be approximately equal to a skin depth in which alternating current flows through the antenna. The electronic device may be configured to be mounted to a tire. In particular, the transponder may be adhesively bonded to a sidewall of the tire, may be embedded within the tire, or may be mounted at other locations within the tire.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Figure 1:
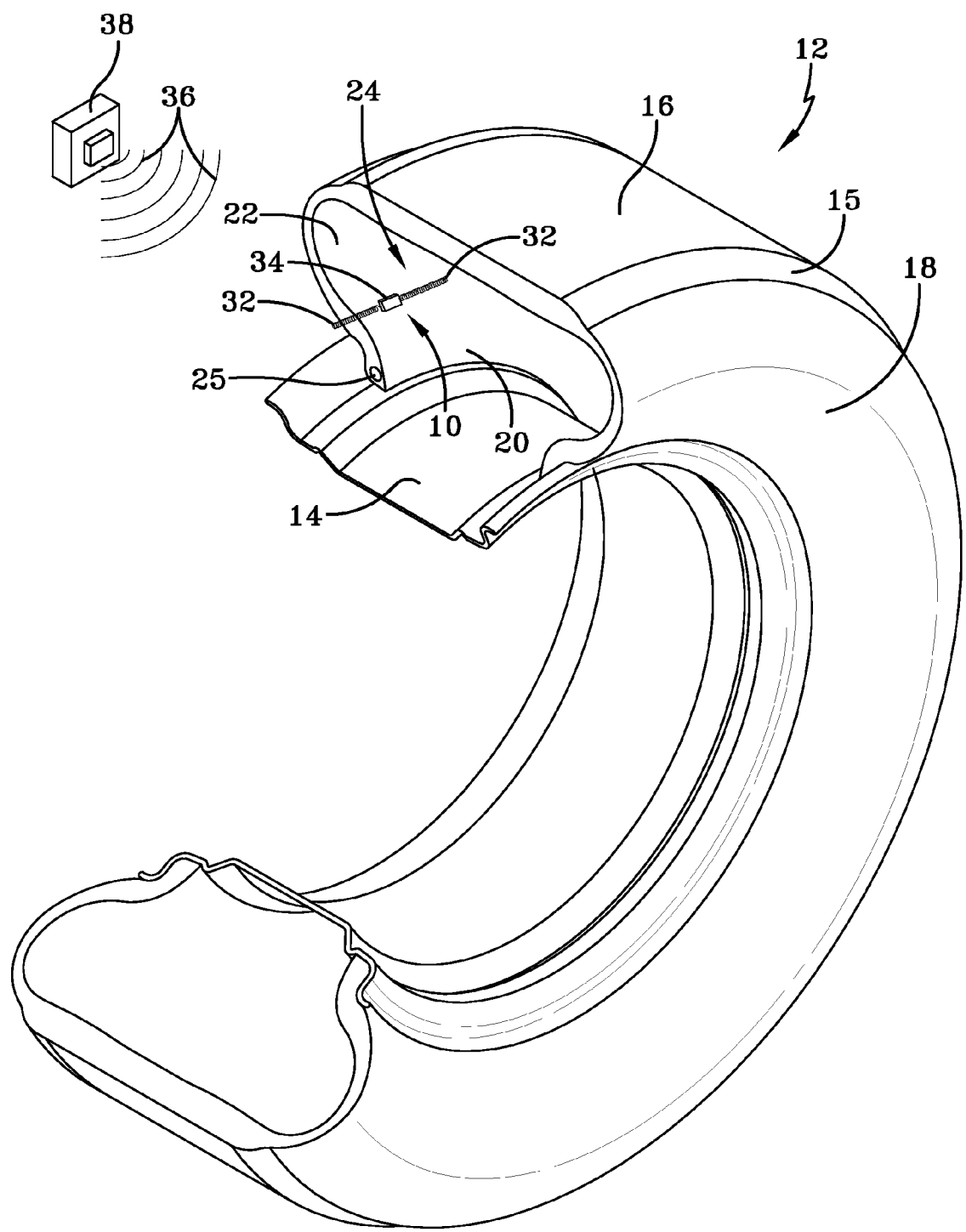
FIG. 1 is a perspective view of a tire carrying an electronic device in accordance with an embodiment of the invention.

With reference to FIG. 1, an electronic device 10 is mounted to a tire 12 either after the tire 12 is manufactured or during its manufacture. The tire 12 is physically mounted to an annular rim 14, which is adapted to be attached to the wheel of a motor vehicle. Rim 14, which is conventionally configured, is composed of a suitably strong metal, such as steel. The tire 12 further includes a tread 16, a sidewall 18, and a shoulder 15 that couples the sidewall 18 with the tread 16. The sidewall 18 terminates at an apex 20 in proximity to the rim 14. The apex 20 and a bead 25 inside the apex 20 assist in holding the tire 12 to the rim 14. The tire 12 is anchored to the rim 14 by the bead 25, which also helps seal an air cavity 24 between the tire 12 and rim 14. The apex 20 stiffens the lower bead area for handling and provides a transition from the relatively soft sidewall 18 to the relatively rigid bead 25 and rim 14.

Generally, the tire 12 consists of a laminated mechanical device of generally toroidal shape, usually an open-torus, that is made of rubber, chemicals, fabric and steel or other materials. The tread 16 is a molded rubber component which, when bonded to a tire casing, includes that portion of the tire 12 that comes into contact with the road when the tire 12 is normally inflated and under normal load. When mounted on the wheel of a motor vehicle, the tire 12 through its tread 16 provides traction and through its air cavity 24 contains the fluid that sustains the vehicle load. The tire 12 may contain additional structural components, such as belts, plies, an overlay, a chafer, a toe-guard, an inner liner, etc.

The location of the electronic device 10 in the tire 12 may be contingent upon various design parameters, such as the operating frequency and functionality of the electronic device 10. Among other locations, the electronic device 10 may be attached by, for example, an adhesive to an inner surface 22 of the sidewall 18 of the tire 12, as shown in FIG. 1, or may be attached in proximity to the tread or apex of the tire 12. The inner surface 22 may comprise an inner liner applied to the sidewall 18. For example, these locations may be desirable if the electronic device 10 carries a pressure sensor that should be placed in fluid communication with the air cavity 24 of the tire 12 so that air pressure within the air cavity 24 of tire 12 can be detected or measured. Alternatively, the electronic device 10 may be embedded at a suitable location within the material of the tire 12 so that the electronic device 10 is isolated from the air cavity 24 of the tire 12.

The electronic device 10 includes a transponder 34, such as a radio frequency identification (RFID) transponder, and one or more antennas 32 that are electrically coupled with the transponder 34. The electronic device 10 is oriented such that the antennas 32 are substantially aligned with the circumference of the sidewall 18. The transponder 34 may include various sensors for detecting tire parameters, such as pressure and temperature.

The transponder 34 may comprise an integrated circuit, a memory storage device coupled with the integrated circuit, and an outer protective package enveloping the integrated circuit and memory storage device. The integrated circuit may comprise a data processing system, such as a microprocessor, field programmable integrated circuit, application specific integrated circuit, and the like, that may be configured to execute operations according to a suitable programmed algorithm. The memory storage device may be any temporary or persistent memory module with any suitable memory capacity. The integrated circuit and memory storage device of the transponder 34 are hidden inside the outer protective package. The integrated circuit of the transponder 34 includes a transceiver that enables it to receive and respond to radio-frequency (RF) queries communicated across a wireless communications link 36 from a transceiver of an interrogator or reader 38 associated with the vehicle to which the tire 12 is mounted. The transceivers of the transponder 34 and reader 38 may comprise any wireless communication device well known to a person having ordinary skill in the art to accomplish the reception and transmission of data between transponder 34 and reader 38.

The transponder 34 may be passive and, thus, require no internal power source. In this circumstance, the transponder 34 is powered by the signal from the transceiver of the reader 38, which activates the respective transponder 34 when information is requested. Alternatively, the transponder 34 may be active and, thus, require a power source. Typically, the transponder 34 has a communication range of about a meter and may transmit and/or receive in a low frequency band (30-300 kHz), high frequency band (3-30 MHz), an ultra-high frequency band (300 MHz to 3 GHz), a microwave band (5.8 GHz), another suitable frequency, or any combination of these frequency bands. In one embodiment of the invention, the transponder 34 may transmit and/or receive at a frequency of about 915 MHz. In another embodiment of the invention, the transponder 34 may transmit and/or receive at a frequency of about 125 kHz.

The transponder 34 may store data, such as a unique identifier, that is capable of being retrieved by the transceiver of the reader 38. For example, each tire 12 in an inventory of tires may be provided with a unique serial number and other unique information regarding manufacture. When the tire 12 is mounted to the motor vehicle to place the transponder 34 into close proximity with the reader 38, the wireless communication link is established for the exchange of information via a stream of RF signals. Data may be stored and exchanged over the wireless communications link 36 in a variety of different code formats understood by a person having ordinary skill in the art.

The reader 38 is configured to interrogate the transponder 34 for the wireless and contactless exchange of data and information. The reader 38 may be configured to record data and information received from the transponder 34, or to perform calculations or mathematical and/or statistical operations using the data and information. Reader 38 may also transmit some or all of the data and information to another device (not shown), such as a display in the motor vehicle for indicating the conditions of the tire 12 to an observer.

Figure 2:
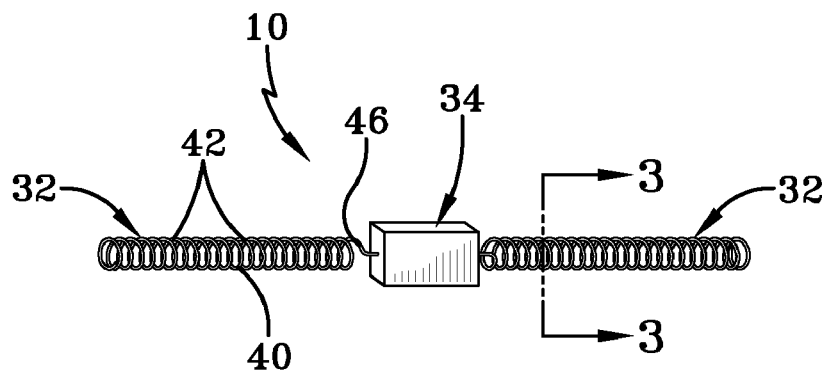
FIG. 2 is a perspective view of the electronic device of FIG. 1.

With reference to FIG. 2 in which like reference numerals refer to like features in FIG. 1, each of the antennas 32, which may be substantially identical, comprises a receiver/transmitter coil 40 with a plurality of individual helical loops or turns 42 of wire. Adjacent turns 42 in the coil 40 are separated by a gap. The wire in the coil 40 of the antenna 32 may be an insulated solid or stranded conductor or may consist of bare solid or stranded conductor separated by insulating rubber during the manufacturing process. The type of wire and number of loops in the receiver/transmitter coil 40 of the antenna 32 is a function of the anticipated environment of the tire use and the required distance of reader communication. A coupling section 46 at one end of each antenna 32 is coupled electrically with a complementary coupling section or contact pad (not shown) of the transponder 34. An opposite end of each antenna 32 is remotely disposed from the transponder 34.

Figure 3:
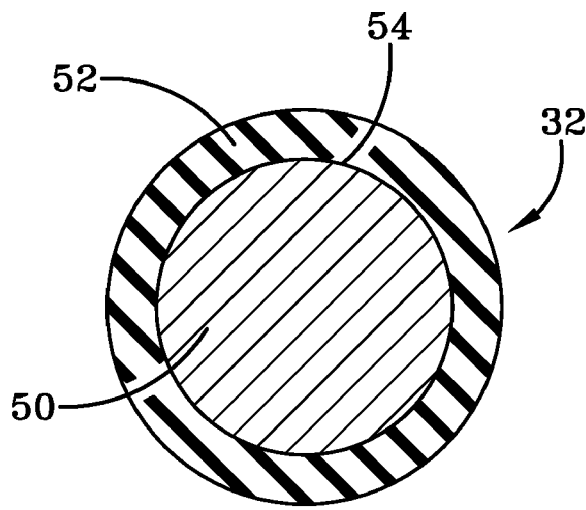
FIG. 3 is a cross-sectional view taken generally along line 3-3 in FIG. 2.

With reference to FIG. 3 in which like reference numerals refer to like features in FIG. 2, the coil 40 of each of the antennas 32 is formed from a substrate or core 50 and a skin coating 52. The skin coating 52 is in the form of a layer coextensive with an outer surface of the core 50 along an interface 54 and radially outside of the core 50 as an annular layer. The skin coating 52 may have a uniform thickness, although the invention is not so limited as the thickness can be modulated about the circumference or along the length of each antenna 32. The skin coating 52 adheres to the outer surface of core 50 as a lamination and is applied to the core 50 after the antenna 32 is placed into its final near net geometrical shape.

Figure 4:
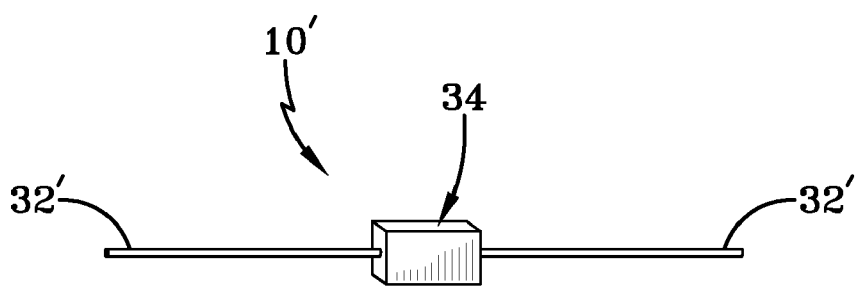
FIG. 4 is a perspective view of an electronic device in accordance with an alternative embodiment of the invention.

The core 50 may be formed from a material having a high electrical conductivity, such as a metal like steel, aluminum, copper, or a copper alloy. Alternatively, the core 50 may comprise a material characterized by a low electrical conductivity, such as non-metals like polymer resins or plastics, or an engineered material, such as nylon or polyester. The enhanced flexibility of the latter engineered materials may permit non-conventional shapes for the antenna 32 because of the ability to distort under the tensile and bending stresses applied by to the tire 12 during operation and during manufacture. This may readily promote the use of non-conventional antenna shapes, such as the substantially linear antennas 32' of electronic device 10' shown in FIG. 4. In an alternative embodiment, the antenna 32 may also comprise an annular ring-shaped structure that is centered on the axis of rotation of the tire 12 and extends about the circumference of the tire 12.

The coating 52 may comprise any suitable conductive material characterized by a higher electrical conductivity than the material comprising the core 50. For example, coating 52 may comprise a metal, like copper or brass, which has a significantly higher electrical conductivity than a core 50 of steel wire. The conductive material comprising coating 52 may also have a lower permeability than the material forming the core 50. For example, coating 52 may comprise a non-magnetic material, such as metals like copper or brass, that has a significantly lower permeability than a core 50 formed of a metal like steel.

The use of non-conducting materials, like polymer resins and plastics, for the core 50 permits a wide variety of processes, such as injection molding processes, to be used to fabricate the core 50. This may in turn enhance the complexity of the geometrical shape in which the antenna 32 may be formed. Exemplary plastics include, but are not limited to, acrylonitrile butadiene styrene (ABS), polypropylene (PP), and polycarbonate (PC).

The coating 52 can be applied to the core 50 by any conventional chemical deposition technique in which a fluid precursor undergoes a chemical change at a solid surface, leaving a solid layer, as understood by a person having ordinary skill in the art. Because the fluid precursor surrounds the solid object, deposition occurs conformally on every surface with little regard to directionality. Exemplary chemical deposition techniques include, but are not limited to, plating and chemical vapor deposition, and other deposition techniques. For example, electroplating is a known technique for applying metallization to a plastic. Coatings applied with coating processes are substantially free from surface defects, whereas conventional brass or zinc coated wire includes surface imperfections as artifacts of the drawing and forming processes. The use of coating processes permits the antenna 32 to be formed to a near net geometrical shape before the coating 52 is applied.

The ability to accurately control the thickness of the coating 52 during a chemical deposition process can be used to optimize antenna properties by depositing a predetermined thickness of coating material on core 50. For example, the thickness of the coating 52 may be selected during deposition to be a definite predetermined thickness that reflects the skin depth in which alternating current flows through a wire. In particular, the predetermined thickness of the coating 52 may be selected to be substantially equal to the skin depth. Most chemical deposition processes allow layer thickness to be controlled within a few tens of nanometers.

The coating 52 applied to the core 50 of the antenna 32 may operate to increase the thickness of another existing coating on the core 50, such as a pre-existing brass or zinc coating present as an artifact of manufacturing the core 50. The antenna 32 may have a complex geometrical shape that is desirable to optimize antenna properties, yet the flexibility of the coating 52 processes used to apply coating 52 permits a controlled thickness of a conductor to be applied to the core 50. In addition, multi-layer coatings 52 in which each individual layer has one or more different properties, such as electrical conductivity, may be applied to the core 50.

The coating 52 may also comprise a metal microparticle or nanoparticle composition that is applied to the core 50 in an uncured state and then cured. The composition may include particles of a metal like silver, or another conductor, dispersed in a matrix used to promote the application of the particles as coating 52. Similar to chemical deposition techniques, the application of the fluid composition promotes a conformal coating 52. Such compositions and methods for applying such compositions are disclosed, for example, in U.S. Publication No. 2006/0189113, which is hereby incorporated by reference herein in its entirety. The conductivity of metal (nano or micro) particles can be increased by arranging the particles so that they are in contact with one another. Nanoparticles have an average maximum dimension less than about one micron. Microparticles have an average maximum dimension less than about ten microns but larger than one micron. In one embodiment, the particles in the coating 52 may comprise a blend of microparticles and nanoparticles.

Although the present invention has been described in conjunction with tire 12 that includes air cavity 24, the electronic device 10 of the present invention may be associated with other objects. For example, the electronic device 10 may be coupled with a non-pneumatic tire or with an object that is unrelated to a tire.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. An electronic device comprising:
   a transponder; and
   an antenna electrically coupled with the transponder, the antenna comprising a core of a first material and a coating of a second material on the core, the second material having at least one of a higher electrical conductivity than the first material or a lower permeability than the first material, and the coating having a predetermined thickness and composed of a plurality of microparticles, a plurality of nanoparticles, or a blend thereof.

2. The electronic device of claim 1 wherein the second material has a lower permeability than the first material.

3. The electronic device of claim 1 wherein the second material has a higher conductivity than the first material.

4. The electronic device of claim 1 wherein the first material is a polymer resin or an engineered material.

5. The electronic device of claim 1 wherein the antenna comprises a coil with a plurality of helically wound turns.

6. The electronic device of claim 1 wherein the predetermined thickness is approximately equal to a skin depth in which alternating current flows through the antenna.

7. An apparatus for mounting on a motor vehicle, the apparatus comprising:
   a tire; and
   an electronic device comprising a transponder mounted to the tire and an antenna electrically coupled with the transponder, the antenna comprising a core of a first material and a coating of a second material on the core, the second material having at least one of a higher electrical conductivity than the first material or a lower permeability than the first material, and the coating having a predetermined thickness and composed of a plurality of microparticles, a plurality of nanoparticles, or a blend thereof.

8. The apparatus of claim 7 wherein the second material has a lower permeability than the first material.

9. The apparatus of claim 7 wherein the second material has a higher conductivity than the first material.

10. The apparatus of claim 7 wherein the first material is a polymer resin or an engineered material.

11. The apparatus of claim 7 wherein the antenna comprises a coil with a plurality of helically wound turns.

12. The apparatus of claim 7 wherein the tire includes a sidewall, and the transponder is adhesively bonded to the sidewall.

13. The apparatus of claim 7 wherein the tire includes an air cavity.

14. The apparatus of claim 13 wherein the transponder communicates with the air cavity.

15. The apparatus of claim 7 wherein the predetermined thickness is approximately equal to a skin depth in which alternating current flows through the antenna.

16. A method of manufacturing an antenna for use with an electronic device, the method comprising:
   forming a core of a first material to a near net geometrical shape of the antenna; and
   coating the core of the antenna with a coating having a predetermined thickness of a second material with at least one of a higher electrical conductivity than the first material or a lower permeability than the first material the coating composed of a plurality of microparticles, a plurality of nanoparticles, or a blend thereof.

17. The method of claim 16 wherein coating the core further comprises:
   performing a chemical deposition process that deposits the predetermined thickness of the coating.

* * * * *

UNITED STATES PATENT AND TRADEMARK OFFICE
CERTIFICATE OF CORRECTION

PATENT NO. : 7,453,407 B2  Page 1 of 1
APPLICATION NO. : 11/618744
DATED : November 18, 2008
INVENTOR(S) : Brian Matthew Logan It is certified that error appears in the above-identified patent and that said Letters Patent is hereby corrected as shown below:

In column 1, line 34, after "by", delete --to--.

In column 4, line 43, after "by", delete --to--.

In Claim 16, column 7, line 8, after "material", insert --,--.

Signed and Sealed this

Fourteenth Day of April, 2009

JOHN DOLL
*Acting Director of the United States Patent and Trademark Office*